US008812310B2

(12) United States Patent
Muhammad et al.

(10) Patent No.: US 8,812,310 B2
(45) Date of Patent: Aug. 19, 2014

(54) ENVIRONMENT RECOGNITION OF AUDIO INPUT

(75) Inventors: Ghulam Muhammad, Riyadh (SA); Khaled S. Alghathbar, Riyadh (SA)

(73) Assignee: King Saud University, Riyadh (SA)

(*) Notice: Subject to any disclaimer, the term of this patent is extended or adjusted under 35 U.S.C. 154(b) by 326 days.

(21) Appl. No.: 13/183,424

(22) Filed: Jul. 14, 2011

(65) Prior Publication Data

US 2012/0046944 A1 Feb. 23, 2012

Related U.S. Application Data

(60) Provisional application No. 61/375,856, filed on Aug. 22, 2010.

(51) Int. Cl.
*G10L 15/00* (2013.01)
*G10L 21/00* (2013.01)
*G10L 25/03* (2013.01)

(52) U.S. Cl.
CPC .................................... *G10L 25/03* (2013.01)
USPC ............................ 704/231; 704/205; 704/211

(58) Field of Classification Search
None
See application file for complete search history.

(56) References Cited

U.S. PATENT DOCUMENTS 5,970,446 A * 10/1999 Goldberg et al. ............ 704/233
6,067,517 A * 5/2000 Bahl et al. .................. 704/256.4
7,010,167 B1 * 3/2006 Ordowski et al. ............ 382/225
7,054,810 B2 * 5/2006 Gao et al. ..................... 704/231
7,081,581 B2 * 7/2006 Allamanche et al. .......... 84/616
7,243,063 B2 * 7/2007 Ramakrishnan et al. ..... 704/215
8,406,525 B2 * 3/2013 Ma et al. ....................... 382/191
2008/0097711 A1 * 4/2008 Kobayashi ...................... 702/75
2009/0138263 A1 * 5/2009 Shozakai et al. .............. 704/243
2010/0057452 A1 * 3/2010 Mukerjee et al. ............. 704/232

OTHER PUBLICATIONS

AlQahtani et al., "Environment Sound Recognition using Zero Crossing Features and MPEG-7", 2010 Fifth International Conference on Digital Information Management (ICDIM), pp. 502-506, Jul. 5-8, 2010.*

Muhammad et al., "Environment Recognition Using Selected MPEG-7 Audio Features and Mel-Frequency Cepstral Coefficients", Proceedings of the 2010 Fifth International Conference on Digital Telecommunications, pp. 11-16, Jun. 13-19, 2010.*

Muhammad et al., "Environment Recognition from Audio Using MPEG-7 Features", 4th International Conference on Embedded and Multimedia Computing, pp. 1-6, Dec. 10-12, 2009.*

Chu et al., "Environmental Sound Recognition With Time-Frequency Audio Features", IEEE Transactions on Audio, Speech, and Language Processing, vol. 17, Issue 6, pp. 1142-1158, Aug. 2009.*

Izumitani et al., "A Background Music Detection Method based on Robust Feature Extraction", IEEE International Conference on Acoustics, Speech and Signal Processing, pp. 13-16, Mar. 31-Apr. 4, 2008.*

(Continued)

*Primary Examiner* — Brian Albertalli
(74) *Attorney, Agent, or Firm* — Hart IP Law & Strategies

(57) ABSTRACT

The present disclosure introduces a new technique for environmental recognition of audio input using feature selection. In one embodiment, audio data may be identified using feature selection. A plurality of audio descriptors may be ranked by calculating a Fisher's discriminant ratio for each audio descriptor. Next, a configurable number of highest ranking audio descriptors based on the Fisher's discriminant ratio of each audio descriptor are selected to obtain a selected feature set. The selected feature set is then applied to audio data. Other embodiments are also described.

20 Claims, 16 Drawing Sheets

(56) References Cited

OTHER PUBLICATIONS

Mitrovic et al., "Analysis of the Data Quality of Audio Features of Environmental Sounds", Journal of Universal Knowledge Management, vol. 1, No. 1, pp. 4-17, 2006.*

Jiming, Zheng, Wei Guohua, and Yang Chunde. "Modified Local Discriminant Bases and Its Application in Audio Feature Extraction." Information Technology and Applications, 2009. IFITA'09. International Forum on. vol. 3. IEEE, 2009.*

Kostek, Bozena, and Pawel Zwan. "Automatic classification of singing voice quality." Intelligent Systems Design and Applications, 2005. ISDA'05. Proceedings. 5th International Conference on. IEEE, 2005.*

Szczuko, Piotr, et al. "MPEG-7-based low-level descriptor effectiveness in the automatic musical sound classification." Audio Engineering Society Convention 116. Audio Engineering Society, 2004.*

Cho, Yong-Choon, and Seungjin Choi. "Nonnegative features of spectro-temporal sounds for classification." Pattern Recognition Letters 26.9 (2005): 1327-1336.*

Chu, Selina, et al. "Where am I? Scene recognition for mobile robots using audio features." Multimedia and Expo, 2006 IEEE International Conference on. IEEE, 2006.*

Mitrovic, Dalibor, Matthias Zeppelzauer, and Horst Eidenberger. "On feature selection in environmental sound recognition." ELMAR, 2009. ELMAR'09. International Symposium. IEEE, 2009.*

Wang, Jia-Ching, et al. "Environmental sound classification using hybrid SVM/KNN classifier and MPEG-7 audio low-level descriptor." Neural Networks, 2006. IJCNN'06. International Joint Conference on. IEEE, 2006.*

* cited by examiner

1000

1200

ENVIRONMENT RECOGNITION OF AUDIO INPUT

RELATED APPLICATIONS

This non-provisional patent application claims priority to provisional patent application No. 61/375,856, filed on 22 Aug. 2010, titled "ENVIRONMENT RECOGNITION USING MFCC AND SELECTED MPEG-7 AUDIO LOW LEVEL DESCRIPTORS," which is hereby incorporated in its entirety by reference.

TECHNICAL FIELD

The present disclosure relates generally to computer systems, and more particularly, systems and methods for environmental recognition of audio input using feature selection.

BACKGROUND

Fields such as multimedia indexing, retrieval, audio forensics, mobile context awareness, etc., have a growing interest in automatic environment recognition from audio files. Environment recognition is a problem related to audio signal processing and recognition, where two main areas are most popular: speech recognition and speaker recognition. Speech or speaker recognition deals with the foreground of an audio file, while environment detection deals with the background.

SUMMARY

The present disclosure introduces a new technique for environmental recognition of audio input using feature selection. In one embodiment, audio data may be identified using feature selection. Multiple audio descriptors are ranked by calculating a Fisher's discriminant ratio for each audio descriptor. Next, a configurable number of highest-ranking audio descriptors based on the Fisher's discriminant ratio of each audio descriptor are selected to obtain a selected feature set. The selected feature set is then applied to audio data. Other embodiments are also described.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Various embodiments will now be described in detail with reference to the accompanying figures ("FIGS.")/drawings.

DETAILED DESCRIPTION

Figure 1:
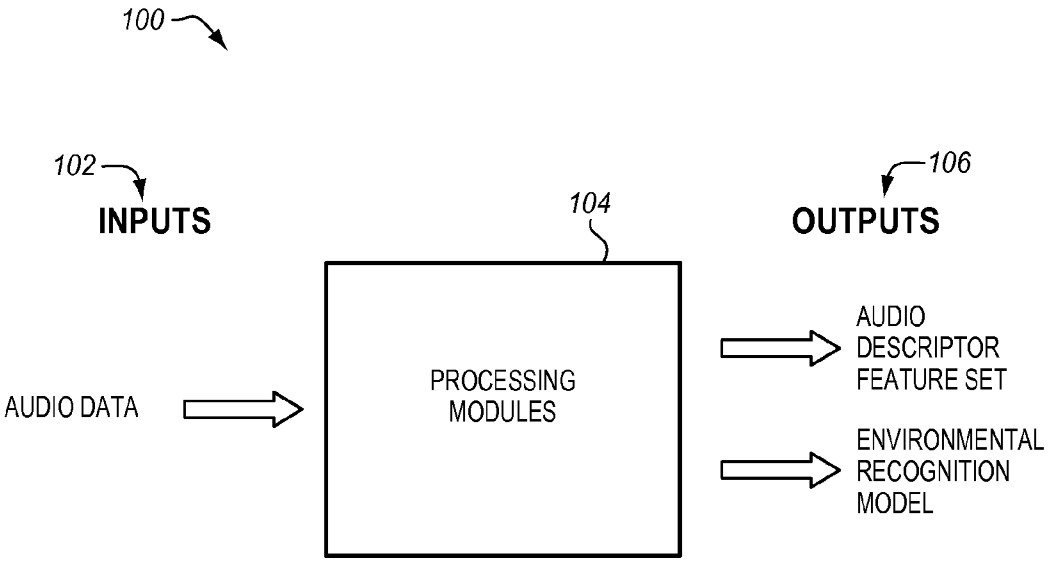
FIG. 1 is a block diagram illustrating a general overview of an audio environmental recognition system, according to an example embodiment.

The following detailed description is divided into several sections. A first section presents a system overview. A next section provides methods of using example embodiments. The following section describes example implementations. The next section describes the hardware and the operating environment in conjunction with which embodiments may be practiced. The final section presents the claims System Level Overview FIG. 1 comprises a block diagram illustrating a general overview of an audio environmental recognition system according to an example embodiment 100. Generally, the audio environmental recognition system 100 may be used to capture and process audio data. In this exemplary implementation, the audio environmental recognition system 100 comprises inputs 102, computer program processing modules 104, and outputs 106.

Figure 16:
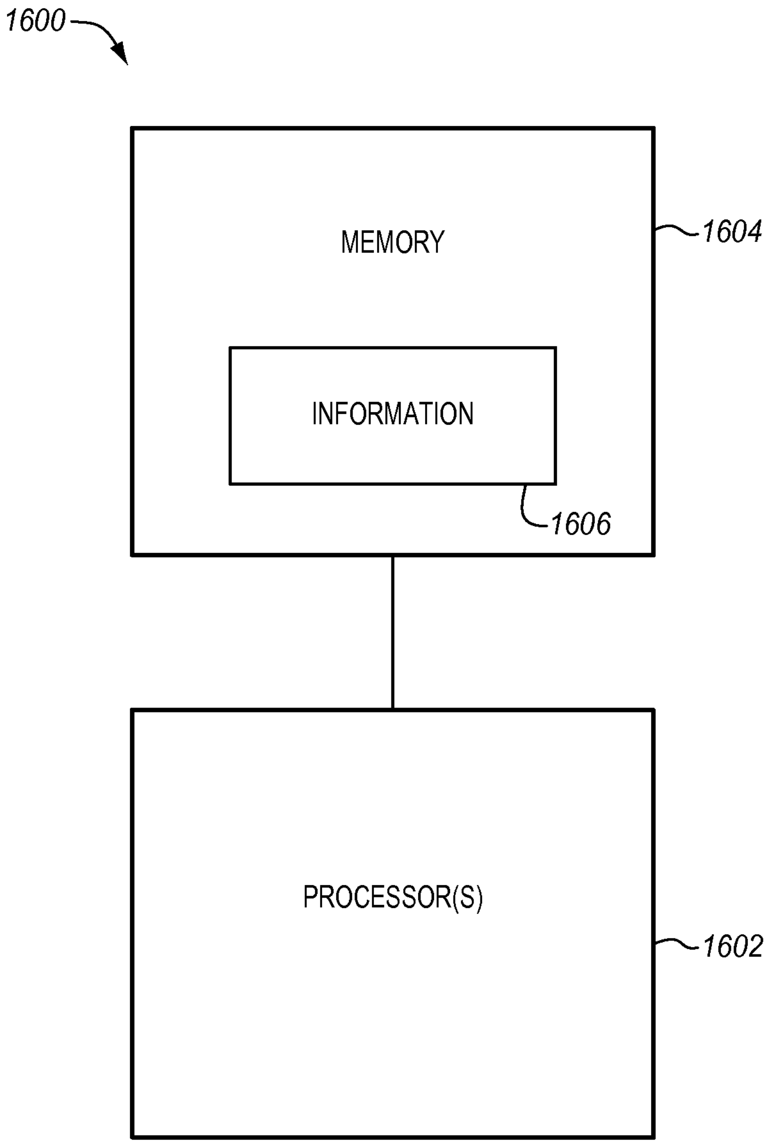
FIG. 16 is a block diagram illustrating an audio environmental recognition system, according to an example embodiment.

In one embodiment, the audio environmental recognition system 100 may be a computer system such as shown in FIG. 16. Inputs 102 are received by processing modules 104 and processed into outputs 106. Inputs 102 may include audio data. Audio data may be any information that perceives sound. In some embodiments, audio data may be captured in an electronic format, including but not limited to digital recordings and audio signals. In many instances, audio data may be recorded, reproduced, and transmitted.

Processing modules 104 generally include routines, computer programs, objects, components, data structures, etc., that perform particular functions or implement particular abstract data types. The processing modules 104 receive inputs 102 and apply the inputs 102 to capture and process audio data producing outputs 106. The processing modules 104 are described in more detail by reference to FIG. 2.

The outputs 106 may include an audio descriptor feature set and environmental recognition model. In one embodiment, inputs 102 are received by processing modules 104 and applied to produce an audio descriptor feature set. The audio descriptor feature set may contain a sample of audio descriptors selected from a larger population of audio descriptors. The feature set of audio descriptors may be applied to an audio signal and used to describe audio content. An audio descriptor may be anything related to audio content description. Among other things, audio descriptors may allow interoperable searching, indexing, filtering and access to audio content. In one embodiment, audio descriptors may describe low-level audio features including but not limited to color, texture, motion, audio energy, location, time, quality, etc. In another embodiment, audio descriptors may describe high-level features including but not limited to events, objects, segments, regions, metadata related to creation, production, usage, etc. Audio descriptors may be either scalar or vector quantities.

Another output 106 is production of an environmental recognition model. An environmental recognition model may be the result of any application of the audio descriptor feature set to the audio data input 102. An environment may be recognized based on analysis of the audio data input 102. In some cases, audio data may contain both foreground speech and background environmental sound. In others, audio data may contain only background sound. In any case, the audio descriptor feature set may be applied to audio data to analyze and model an environmental background. In one embodiment, the processing modules 104 described in FIG. 2 may apply statistical methods for characterizing spectral features of audio data. This may provide a natural and highly reliable way of recognizing background environments from audio signals for a wide range of applications. In another embodiment, environmental sounds may be recorded, sampled, and compared to audio data to determine a background environment. By applying the audio descriptor feature set, a background environment of audio data may be recognized.

Figure 2:
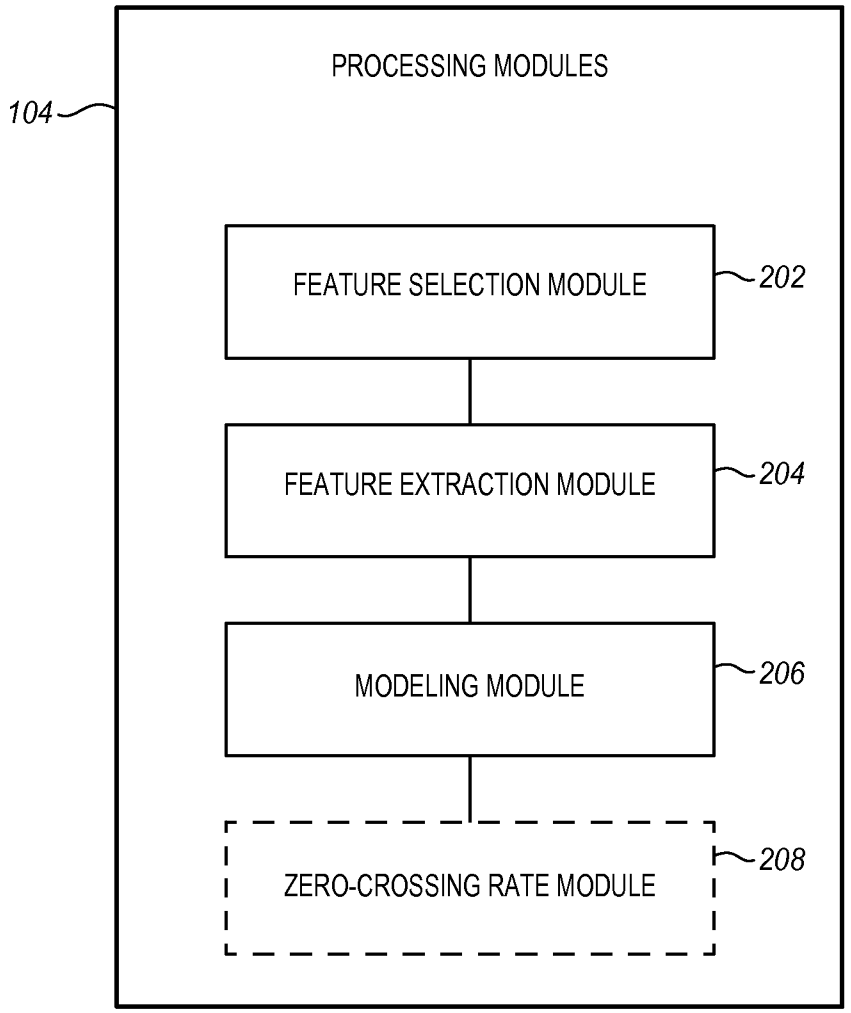
FIG. 2 is a block diagram illustrating a set of computer program modules to enable environmental recognition of audio input into a computer system, according to an example embodiment.

FIG. 2 is a block diagram of the processing modules 104 of the system shown in FIG. 1, according to various embodiments. Processing modules 104, for example, comprise a feature selection module 202, a feature extraction module 204, and a modeling module 206. Alternative embodiments are also described below.

The first module, a feature selection module 202, may be used to rank a plurality of audio descriptors 102 and select a configurable number of descriptors from the ranked audio descriptors to obtain a feature set. In one embodiment, the feature selection module 202 ranks the plurality of audio descriptors by calculating the Fisher's discriminant ratio ("F-ratio") for each individual audio descriptor. The F-ratio may take both the mean and variance of each of the audio descriptors. Specific application of F-ratios applied to audio descriptors is described in the "Exemplary Implementations" section below. In another embodiment, the audio descriptors may be MPEG-7 low-level audio descriptors.

In another embodiment, the feature selection module 202 may also be used to select a configurable number of audio descriptors based on the F-ratio calculated for each audio descriptor. The higher the F-ratio, the better the audio descriptor may be for application to specific audio data. A configurable number of audio descriptors may be selected from the ranked plurality of audio descriptors. The configurable number of audio descriptors selected may be as few as one audio descriptor, but may also be a plurality of audio descriptors. A user, applying statistical analysis to audio data may make a determination as to the level of detailed analysis it wishes to apply. The configurable number of audio descriptors selected makes up the feature set. The feature set is a collection of selected audio descriptors, which together create an object applied to specific audio data. Among other things, the feature set applied to the audio data may be used to determine a background environment of the audio.

The second module, a feature extraction module 204, may be used to extract the feature set obtained by the feature selection module and append the feature set with a set of frequency scale information approximating sensitivity of the human ear. When the feature selection module 202 first selects the audio descriptors, they are correlated. The feature extraction module 204 may de-correlate the selected audio descriptors of the feature set by applying logarithmic function, followed by discrete cosine transform. After de-correlation, the feature extraction module 204 may project the feature set onto a lower dimension space using Principal Component Analysis ("PCA"). PCA may be used as a tool in exploratory data analysis and for making predictive models. PCA may supply the user with a lower-dimensional picture, or "shadow" of the audio data, for example, by reducing the dimensionality of the transformed data.

Furthermore, the feature extraction module 204 may append the feature set with a set of frequency scale information approximating sensitivity of the human ear. By appending the selected feature set, the audio data may be more effectively analyzed by additional features in combination with the already selected audio descriptors of the feature set. In one embodiment, the set of frequency scale information approximating sensitivity of the human ear may be the Mel-frequency scale. Mel-frequency cepstral coefficient ("MFCC") features may be used to append the feature set.

The third module, a modeling module 206, may be used to apply the combined feature set to at least one audio input to determine a background environment. In one embodiment, environmental classes are modeled using environmental sound only from the audio data. No artificial or human speech may be added. In another embodiment, a speech model may be developed incorporating foreground speech in combination with environmental sound. The modeling module 206 may use statistical classifiers to aid in modeling a background environment of audio data. In one embodiment, the modeling module 206 utilizes Gaussian mixture models ("GMMs") to model the audio data. Other statistical models may be used to model the background environment including hidden Markov models (HMMs).

In an alternative embodiment, an additional processing module 104, namely, a zero-crossing rate module 208 may be used to improve dimensionality of the modeling module by appending zero-crossing rate features with the feature set. Zero-crossing rate may be used to analyze digital signals by examining the rate of sign-changes along a signal. Combining zero-crossing rate features with the audio descriptor features may yield better recognition of background environments for audio data. Combining zero-crossing rate features with audio descriptors and frequency scale information approximating sensitivity of the human ear may yield even better accuracy in environmental recognition.

Exemplary Methods

In this section, particular methods to identify audio data and example embodiments are described by reference to a series of flow charts. The methods to be performed may constitute computer programs made up of computer-executable instructions.

Figure 3:
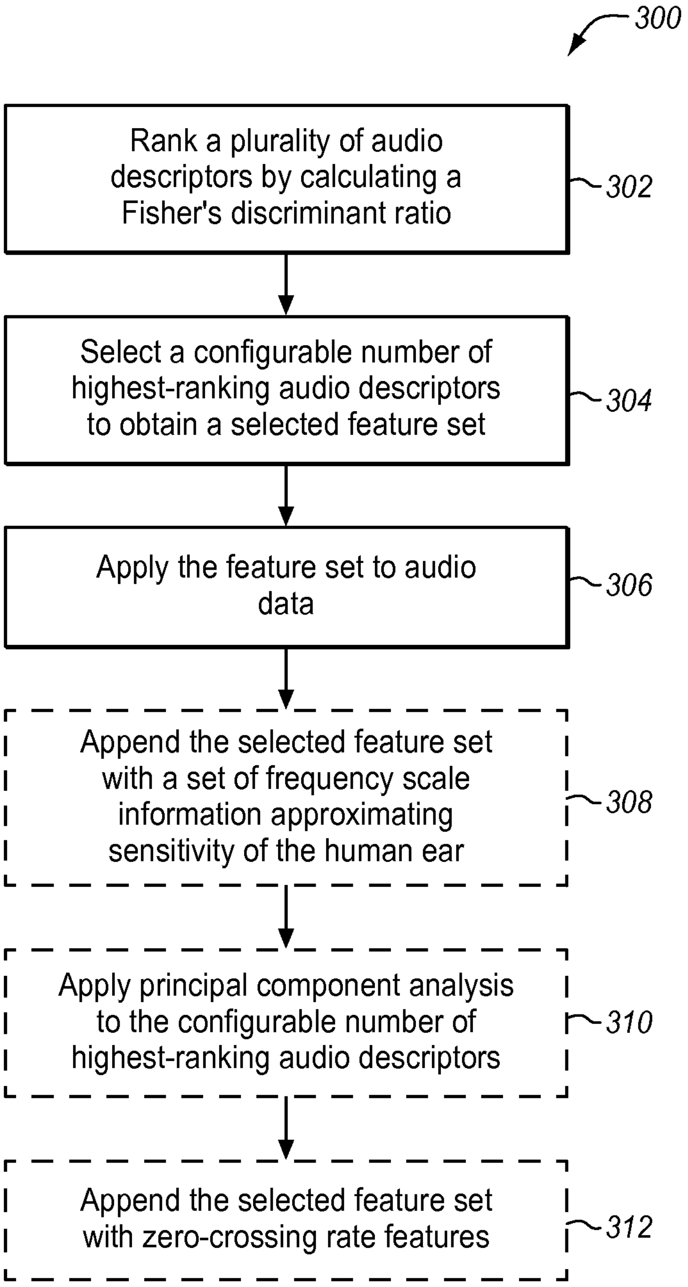
FIG. 3 is a block diagram illustrating a method to identify audio data, according to an example embodiment.

FIG. 3 is a block diagram illustrating a method to identify audio data, according to an example embodiment. The method 300 represents one embodiment of an audio environmental recognition system such as the audio environmental recognition system 100 described in FIGS. 1 and 16 below. The method 300 may be implemented by ranking a plurality of audio descriptors 106 by calculating an F-Ratio for each audio descriptor (block 302), selecting a configurable number of highest-ranking audio descriptors based on the F-ratio of each audio descriptor to obtain a selected feature set (block 304), and applying the selected feature set to audio data (block 306).

Calculating an F-ratio for each audio descriptor at block 302 ranks a plurality of audio descriptors. An audio descriptor may be anything related to audio content description as described in FIG. 1. In one embodiment, an audio descriptor may be a low-level audio descriptor. In another embodiment, an audio descriptor may be a high-level audio descriptor. In an alternative embodiment, an audio descriptor may be an MPEG-7 low-level audio descriptor. In yet another alternative embodiment of block 302, calculating the F-ratio for the plurality of audio descriptors may be performed using a processor.

At block 304, a configurable number of highest-ranking audio descriptors are selected to obtain a feature set. The feature set may be selected based on the calculated F-ratio of each audio descriptor. As previously described in FIG. 2, the configurable number of audio descriptors selected may be as few as one audio descriptor, but may also be a plurality of audio descriptors. A user, applying statistical analysis to audio data may make a determination as the number of features it wishes to apply. In an alternative embodiment of block 304, selection of the configurable number of highest-ranking audio descriptors may be performed using a processor.

The feature set is applied to audio data at block 306. As described in FIG. 1, audio data may be any information that perceives sound. In some embodiments, audio data may be captured in an electronic format, including but not limited to digital recordings and audio signals. In one embodiment, audio data may be a digital data file. The feature set may be electronically applied to the digital data file, analyzing the audio data. Among other things, the feature set applied to the audio data may be used to determine a background environment of the audio. In some embodiments, statistical classifiers such as GMMs may be used to model a background environment for the audio data.

An alternative embodiment to FIG. 3 further comprises appending the selected feature set with a set of frequency scale information approximating sensitivity of the human ear. In one alternative embodiment, the set of frequency scale information approximating sensitivity of the human ear is a Mel-frequency scale. MFCC features may be used to append the feature set.

Another alternative embodiment to FIG. 3 includes applying PCA to the configurable number of highest-ranking audio descriptors to obtain the selected feature set. PCA may be used to de-correlate the features of the selected feature set. Additionally, PCA may be used to project the selected feature set onto a lower dimension space. Yet another alternative embodiment further includes appending the selected feature set with zero-crossing rate features.

Figure 4:
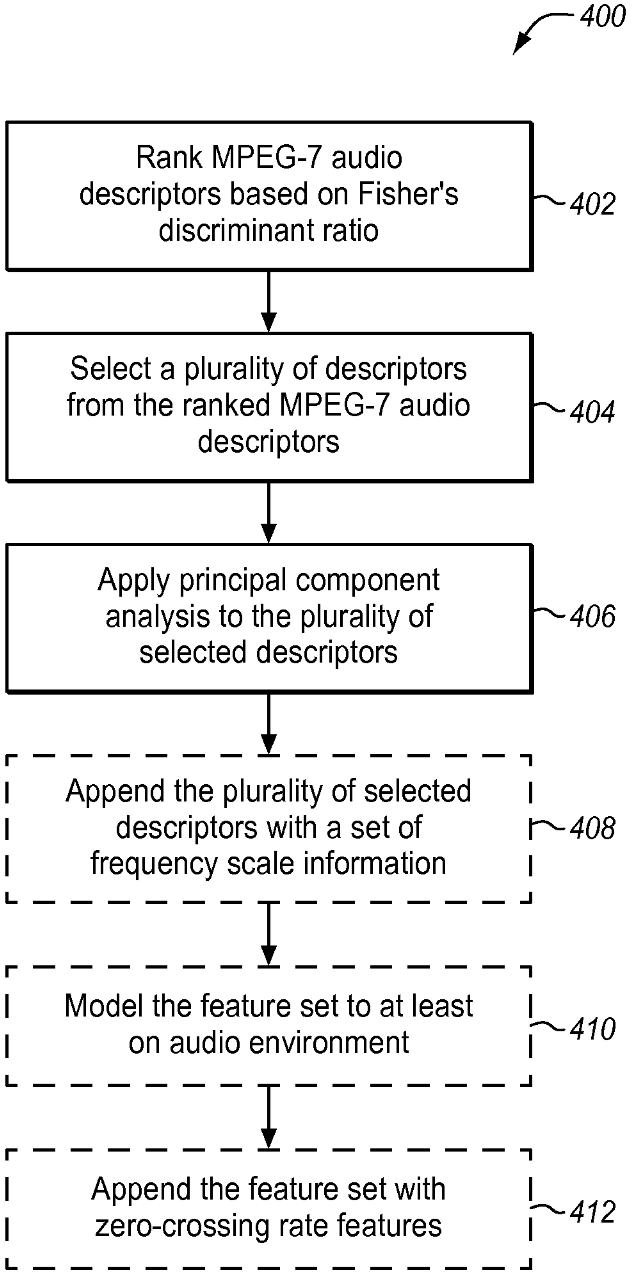
FIG. 4 is a block diagram illustrating a method to select features for environmental recognition of audio input, according to an example embodiment.

FIG. 4 is a block diagram illustrating a method to select features for environmental recognition of audio input. The method 400 represents one embodiment of an audio environmental recognition system such as the audio environmental recognition system 100 described in FIG. 1. The method 400 may be implemented by ranking MPEG-7 audio descriptors by calculating a Fisher's discriminant ratio for each audio descriptor (block 402), selecting a configurable number of highest-ranking audio descriptors based on the Fisher's discriminant ratio of each MPEG-7 audio descriptor (block 404), and applying principal component analysis to the selected highest-ranking audio descriptors to obtain a feature set (block 406).

Calculating an F-ratio for each MPEG-7 audio descriptor at block 402 ranks a plurality of MPEG-7 audio descriptors. Specific application of F-ratios applied to audio descriptors is described in the "Exemplary Implementations" section below. The plurality of MPEG-7 audio descriptors may be MPEG-7 low-level audio descriptors. There are seventeen (17) temporal and spectral low-level descriptors (or features) in MPEG-7 audio. The seventeen descriptors may be divided into scalar and vector types. Scalar type returns scalar value such as power or fundamental frequency, while vector type returns, for example, spectrum flatness calculated for each band in a frame. A complete listing of MPEG-7 low-level descriptors can be found in the "Exemplary Implementations" section below. In an alternative embodiment of block 402, ranking the plurality of MPEG-7 audio descriptors may be performed using a processor.

A configurable number of highest-ranking MPEG-7 audio descriptors are selected to at block 404. In one embodiment, the configurable number of highest-ranking MPEG-7 audio descriptors may be selected based on the calculated F-ratio of each audio descriptor. As previously described in FIG. 2, the configurable number of audio descriptors selected may be as few as one audio descriptor, but may also be a plurality of audio descriptors. A user, applying statistical analysis to audio data may make a determination as the number of features it wishes to apply. In an alternative embodiment of block 404, selection of the configurable number of highest-ranking MPEG-7 audio descriptors may be performed using a computer processor.

PCA is applied to the selected highest-ranking MPEG-7 audio descriptors to obtain a feature set at block 406. In one embodiment, the feature set may be selected based on the calculated F-ratio of each MPEG-7 audio descriptor. Similar to FIG. 3, PCA may be used to de-correlate the features of the feature set. Additionally, PCA may be used to project the feature set onto a lower dimension space. In an alternative embodiment of block 406, application of PCA to the selected highest-ranking MPEG-7 audio descriptors may be performed using a processor.

At block 408, an alternative embodiment to FIG. 4 further comprises appending the selected feature set with a set of frequency scale information approximating sensitivity of the human ear. In one alternative embodiment, the set of frequency scale information approximating sensitivity of the human ear is a Mel-frequency scale. MFCC features may be used to append the feature set.

Another alternative embodiment to FIG. 4 includes modeling, at block 410, the appended feature set to at least one audio environment. Modeling may further include applying a statistical classifier to model a background environment of an audio input. In one embodiment, the statistical classifier used to model the audio input may be a GMM.

Yet another alternative embodiment to FIG. 4 includes appending, at block 412, the feature set with zero-crossing rate features.

Figure 5:
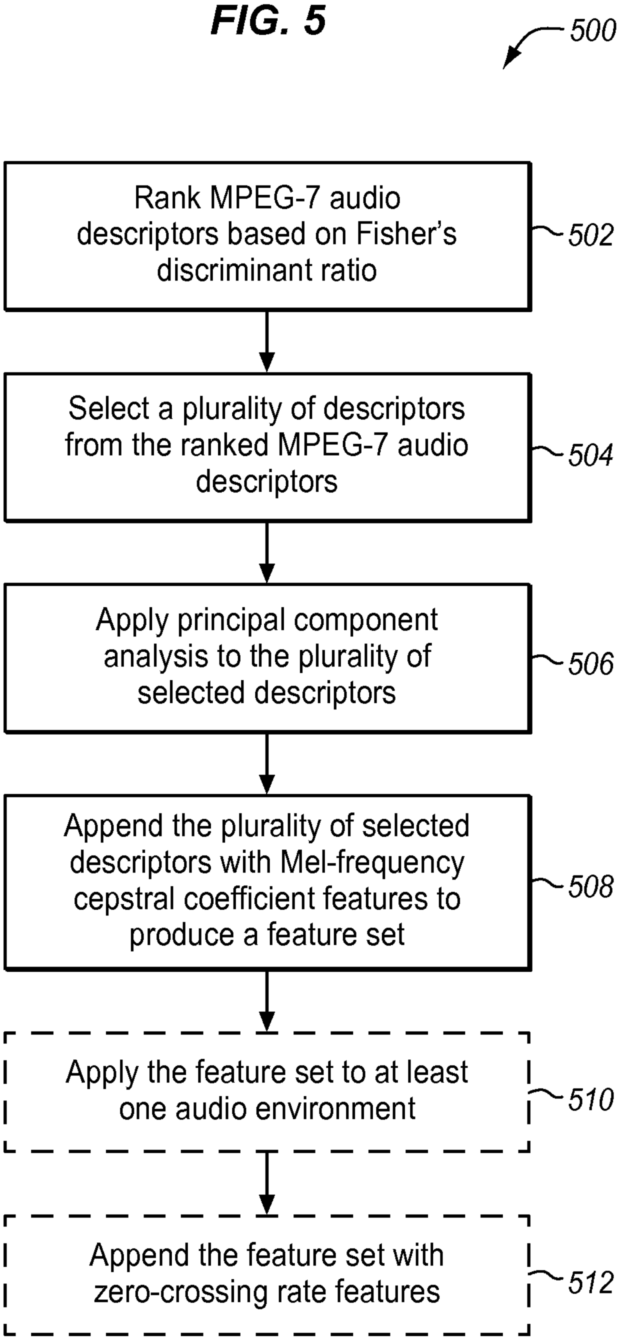
FIG. 5 is a block diagram illustrating a method to select features for environmental recognition of audio input, according to an example embodiment.

FIG. 5 is a block diagram illustrating a method to select features for environmental recognition of audio input. The method 500 represents one embodiment of an audio environmental recognition system such as the audio environmental recognition system 100 described in FIG. 1. The method 500 may be implemented by ranking MPEG-7 audio descriptors based on Fisher's discriminant ratio (block 502), selecting a plurality of descriptors from the ranked MPEG-7 audio descriptors (block 504), applying principal component analysis to the plurality of selected descriptors to produce a feature set used to analyze at least one audio environment (block 506), and appending the feature set with Mel-frequency cepstral coefficient features to improve dimensionality of the feature set (block 508).

MPEG-7 audio descriptors are ranked by calculating an F-ratio for each MPEG-7 audio descriptor at block 502. As described in FIG. 4, there are seventeen MPEG-7 low-level audio descriptors. Specific application of F-ratios applied to audio descriptors is described in the "Exemplary Implementations" section below. A plurality of descriptors from the ranked MPEG-7 audio descriptors is selected at block 504. In one embodiment, the plurality of descriptors may be selected based on the calculated F-ratio of each audio descriptor. The plurality of descriptors selected may comprise the feature set produced at block 506.

PCA is applied to the plurality of selected descriptors to produce a feature set at block 506. The feature set may be used to analyze at least one audio environment. In some embodiments, the feature set may be applied to a plurality of audio environments. Similar to FIG. 3, PCA may be used to decorrelate the features of the feature set. Additionally, PCA may be used to project the feature set onto a lower dimension space. The feature set is appended with MFCC features at block 508. The feature set may be appended to improve the dimensionality of the feature set.

An alternative embodiment of FIG. 5 further comprises applying, at block 510, the feature set to the at least one audio environment. Applying the feature set to at least one audio environment may further include utilizing statistical classifiers to model the at least one audio environment. In one embodiment, GMMs may be used as the statistical classifier to model at least one audio environment.

Another embodiment of FIG. 5 further includes appending, at block 512, the feature set with zero-crossing rate features to further analyze the at least one audio environment.

Exemplary Implementations

Figure 6:
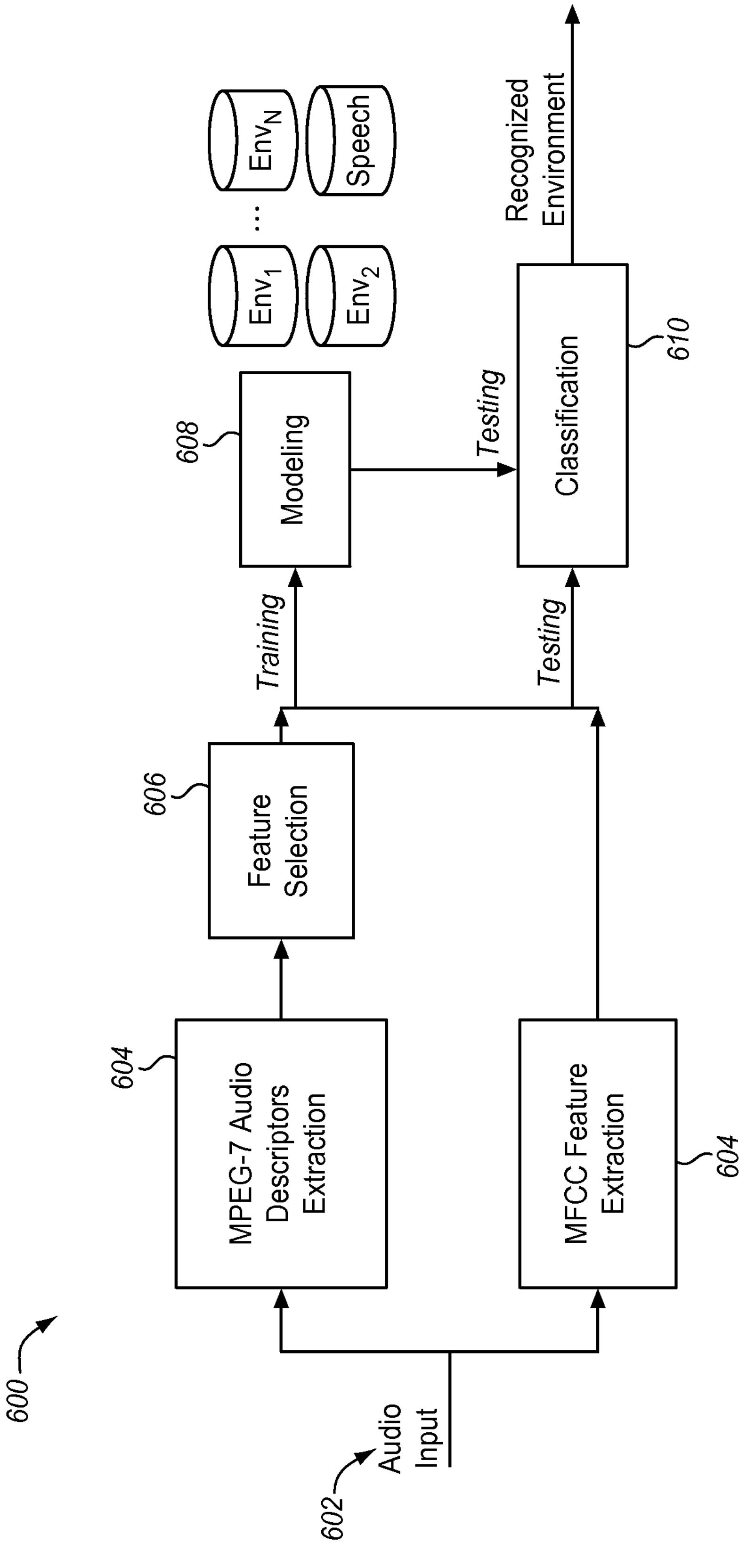
FIG. 6 is a block diagram illustrating a system for environment recognition of audio, according to an example embodiment.

Various examples of computer systems and methods for embodiments of the present disclosure have been described above. Listed and explained below are alternative embodiments, which may be utilized in environmental recognition of audio data. Specifically, an alternative example embodiment of the present disclosure is illustrated in FIG. 6. Additionally, MPEG-7 audio features for environment recognition from audio files, as described in the present disclosure are listed below. Moreover, experimental results and discussion incorporating example embodiments of the present disclosure are provided below.

FIG. 6 is an alternative example embodiment illustrating a system for environment recognition of audio using selected MPEG-7 audio low level descriptors together with conventional mel-frequency cepstral coefficients (MFCC). Block 600 demonstrates a flowchart which illustrates the modeling of audio input. At block 602, audio input is received. Audio input may be any audio data capable of being captured and processed electronically.

Once the audio input is received, at block 602, feature extraction is applied to the audio input at block 604. In one embodiment of block 604, MPEG-7 audio descriptor extraction as well as MFCC feature extraction, may be applied to the audio input. MPEG-7 audio descriptors are first ranked based on F-ratio. Then top descriptors (e.g., thirty (30) descriptors) extracted at block 604 may be selected at block 606. In one embodiment, the feature selection of block 606 may include PCA. PCA may be applied to these selected descriptors to obtain a reduced number of features (e.g., thirteen (13) features). These reduced features may be appended with MFCC features to complete a selected feature set of the proposed system.

The selected features may be applied to the audio input to model at least one background environment at block 608. In one embodiment, statistical classifiers may be applied to the audio input, at block 610, to aid in modeling the background environment. In some embodiments, Gaussian mixture models (GMMs) may be used as classifier to model the at least one audio environment. Block 600 may produce a recognizable environment for the audio input.

MPEG-7 Audio Features

There are seventeen (17) temporal and spectral low-level descriptors (or features) in MPEG-7 Audio. The low-level descriptors can be divided into scalar and vector types. Scalar type returns scalar value such as power or fundamental frequency, while vector type returns, for example, spectrum flatness calculated for each band in a frame. In the following we describe, in brief, MPEG-7 Audio low-level descriptors:

1. Audio Waveform ("AW"): It describes the shape of the signal by calculating the maximum and the minimum of samples in each frame.

2. Audio Power ("AP"): It gives temporally smoothed instantaneous power of the signal.

3. Audio Spectrum Envelop ("ASE": vector): It describes short time power spectrum for each band within a frame of a signal.

4. Audio Spectrum Centroid ("ASC"): It returns the center of gravity (centroid) of the log-frequency power spectrum of a signal. It points the domination of high or low frequency components in the signal.

5. Audio Spectrum Spread ("ASS"): It returns the second moment of the log-frequency power spectrum. It demonstrates how much the power spectrum is spread out over the spectrum. It is measured by the root mean square deviation of the spectrum from its centroid. This feature can help differentiate between noise-like or tonal sound and speech.

6. Audio Spectrum Flatness ("ASF": vector): It describes how much flat a particular frame of a signal is within each frequency band. Low flatness may correspond to tonal sound.

7. Audio Fundamental Frequency ("AFF"): It returns fundamental frequency (if exists) of the audio.

8. Audio Harmonicity ("AH"): It describes the degree of harmonicity of a signal. It returns two values: harmonic ratio and upper limit of harmonicity. Harmonic ratio is close to one for a pure periodic signal, and zero for noise signal.

9. Log Attack Time ("LAT"): This feature may be useful to locate spikes in a signal. It returns the time needed to rise from very low amplitude to very high amplitude.

10. Temporal Centroid ("TC"): It returns the centroid of a signal in time domain.

11. Spectral Centroid ("SC"): It returns the power-weighted average of the frequency bins in linear power spectrum. In contrast to Audio Spectrum Centroid, it represents the sharpness of a sound.

12. Harmonic Spectral Centroid ("HSC").

13. Harmonic Spectral Deviation ("HSD").

14. Harmonic Spectral Spread ("HSS").

15. Harmonic Spectral Centroid ("HSC"): The items (l-o) characterize the harmonic signals, for example, speech in cafeteria or coffee shop, crowded street, etc.

16. Audio Spectrum Basis ("ASB: vector"): These are features derived from singular value decomposition of a normalized power spectrum. The dimension of the vector depends on the number of basic functions used.

17. Audio Spectrum Projection ("ASP: vector"): These features are extracted after projection on a spectrum upon a reduced rank basis. The number of vector depends on the value of rank.

The above seventeen (17) descriptors are broadly classified into six (6) categories: basic (AW, AP), basic spectral (ASE, ASC, ASS, ASF), spectral basis (ASB, ASP), signal parameters (AH, AFF), timbral temporal (LAT, TC), and timbral spectral (SC, HSC, HSD, HSS, HSV). In the conducted experiments, a total of sixty four (64) dimensional MPEG-7 audio descriptors were used. These 64 dimensions comprise of two (2) AW (min and max), nine (9) dimensional ASE, twenty one (21) dimensional ASF, ten (10) dimensional ASB, nine (9) dimensional ASP, 2 dimensional AH (AH and upper limit of harmonicity (ULH)), and other scalar descriptors. For ASE and ASB, one (1) octave resolution was used.

Feature Selection

Feature selection is an important aspect in any pattern recognition applications. Not all the features are independent to each other, nor they all are relevant to some particular tasks. Therefore, many types of feature selection methods are proposed. In this study, F-ratio is used. F-ratio takes both mean and variance of the features. For a two-class problem, the ratio of the ith dimension in the feature space can be expressed as in equation one (1) below:

$$f_i = \frac{(\mu_{1i} - \mu_{2i})^2}{\sigma_{1i}^2 - \sigma_{2i}^2}$$

In equation (1), "$\mu_{1i}$", "$\mu_{2i}$", "$\sigma^2{}_{1i}$", and "$\sigma^2{}_{2i}$" are the mean values and variances of the ith feature to class one (1) and class two (2) respectively.

The maximum of "$f_i$" over all the feature dimensions can be selected to describe a problem. The higher the f-ratio is the better the features may be for the given classification problem. For M number of classes and N dimensional features, the above equation will produce "${}^{M}C_2 \times N$" (row×column) entries. The overall F-ratio for each feature is then calculated using column wise mean and variances as in equation two (2) below:

$$f_i = \frac{\mu^2}{\sigma^2}$$

In equation two (2), "$\mu^2$" and "$\sigma^2$" are mean and variances of F-ratios of two-class combinations for feature i. Based on the overall F-ratio, in one implementation, the first thirty (30) highest valued MPEG-7 audio descriptors may be selected.

Figure 7:
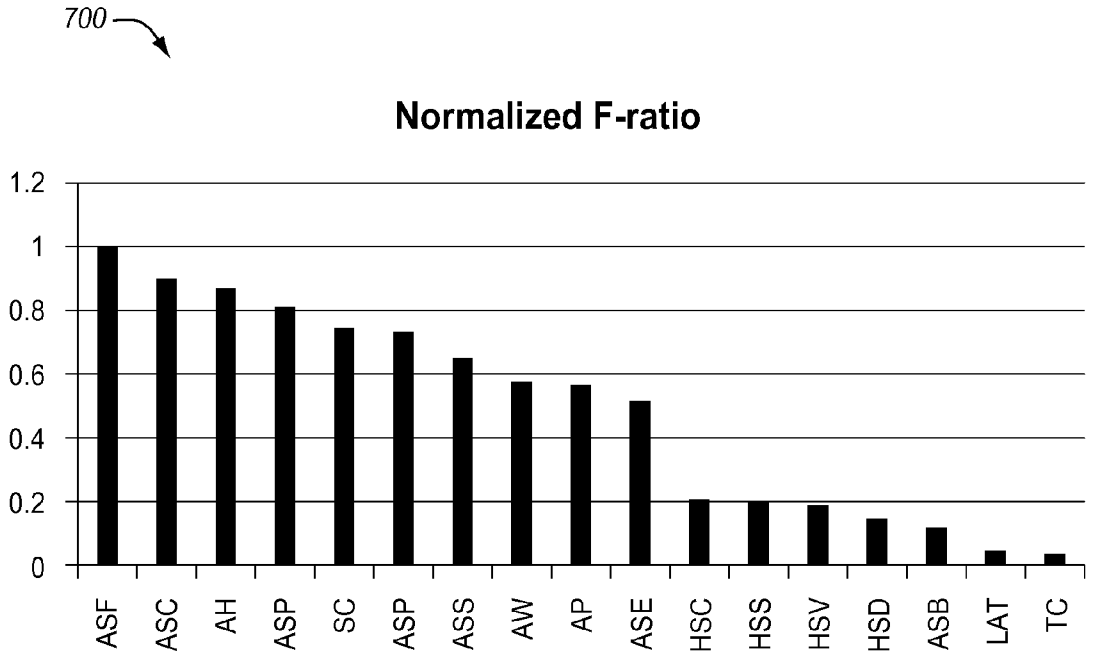
FIG. 7 is a graphical representation of normalized F-ratio's for 17 MPEG-7 audio descriptors, according to an example embodiment.

FIG. 7 is a graphical representation of normalized F-ratio's for seventeen (17) MPEG-7 audio descriptors. Vectors of a particular type are grouped into scalar for that type. The vertical axis of block 700 shows a scale of F-ratios, while the horizontal axis represents the seventeen (17) different MPEG-7 low-level audio descriptors. Block 700 shows that basic spectral group (ASE, ASC, ASS, ASF), signal parameter group (AH, AFF) and ASP have high discriminative power, while timbral temporal and timbral spectral groups may have less discriminative power. After selecting MPEG-7 features, we may apply logarithmic function, followed by discrete cosine transform ("DCT") to de-correlate the features. The de-correlated features may be projected onto a lower dimension by using PCA. PCA projects the features onto lower dimension space created by the most significant eigenvectors. All the features may be mean and variance normalized.

Classifiers

In one embodiment, Gaussian Mixture Models ("GMMs") may be used as classifier. Alternative classifiers to GMMs may be used as well. In another embodiment, Hidden Markov Models ("HMMs") may be used as a classifier. In one implementation, the number of mixtures may be varied within one to eight, and then is fixed, for example, to four, which gives an optimal result. Environmental classes are modeled using environment sound only (no added artificially human speech). One Speech model may be developed using male and female utterances without the environment sound. The speech model may be obtained using five male and five female utterances of short duration (e.g., four (4) seconds) each.

Figure 8:
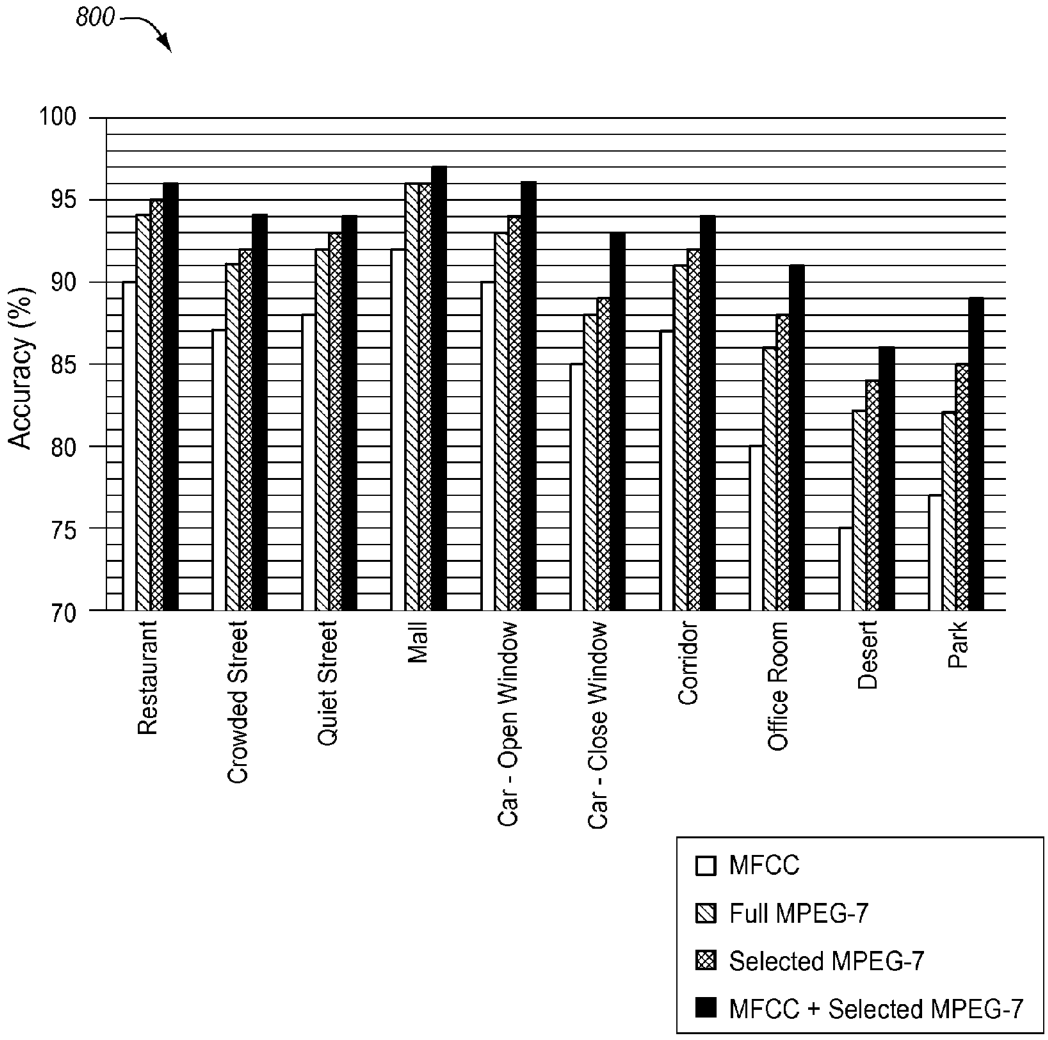
FIG. 8 is a graphical representation of the recognition accuracy of different environment sounds, according to an example embodiment.

FIG. 8 is a graphical representation of the recognition accuracy of different environment sounds, according to an example embodiment. Block 800 shows the recognition accuracy of different environmental sounds for ten different environments, evaluating four unique feature parameters. In this embodiment, no human speech was added in the audio clips. The vertical axis of block 800 shows recognition accuracies (in percentage) of the four unique feature parameters, while the horizontal axis represents ten (10) different audio environments.

Results and Discussion

In the experiments, some embodiments use the following four (4) sets of feature parameters. The numbers inside the parenthesis after the feature names correspond to the dimension of feature vector.

1. MFCC (13)
2. All MPEG-7 descriptors+PCA (13)
3. Selected 24 MPEG-7 descriptors+PCA (13)
4. i+iii. (26)

Returning to FIG. 8, block 800 gives the accuracy in percentage (%) of environment recognition using different types of feature parameters when no human speech was added artificially. The four bars in each environment class represent accuracies with the above-mentioned features. From the figure, we may see that the mall environment has the highest accuracy of ninety-two percent (92%) using MFCC. A significant improvement is achieved ninety-six percent (96%) accuracy using MPEG-7 features. However, it improves further to ninety-seven percent (97%) while using a combined feature set of MFCC and MPEG-7. The second best accuracy was obtained with restaurant and car with open windows environments. In the case of restaurant environment, MFCC and full MPEG-7 descriptors give ninety percent (90%) and ninety-four percent (94%) accuracies, respectively. Selected MPEG-7 descriptors improve it to ninety-five percent (95%), while combined MFCC and selected MPEG-7 features give the best with ninety-six percent (96%) accuracy.

In case of the park environment, the accuracy is bettered by eleven percent (11%), comparing between using MFCC and using combined set. If we look through all the environments, we can easily find out that the accuracy is enhanced with selected MPEG-7 descriptors than using full MPEG-7 descriptors and the best performance is with the combined feature set. This indicates that both the types are complementary to each other, and that MPEG-7 features have upper hand over MFCC for environment recognition. If we see the accuracies obtained by the full MPEG-7 descriptors and the selected MPEG-7 descriptors, we can find that almost in every environment case, the selected MPEG-7 descriptors perform higher than the full ones. This can be attributed to the fact that non-discriminative descriptors contribute to the accuracy negatively. Timbral temporal (LAT, TC) and timbral spectral (SC, HSC, HSD, HSS, HSV) descriptors have very low discriminative power in environment recognition application; rather they are useful to music classification.

Figure 9:
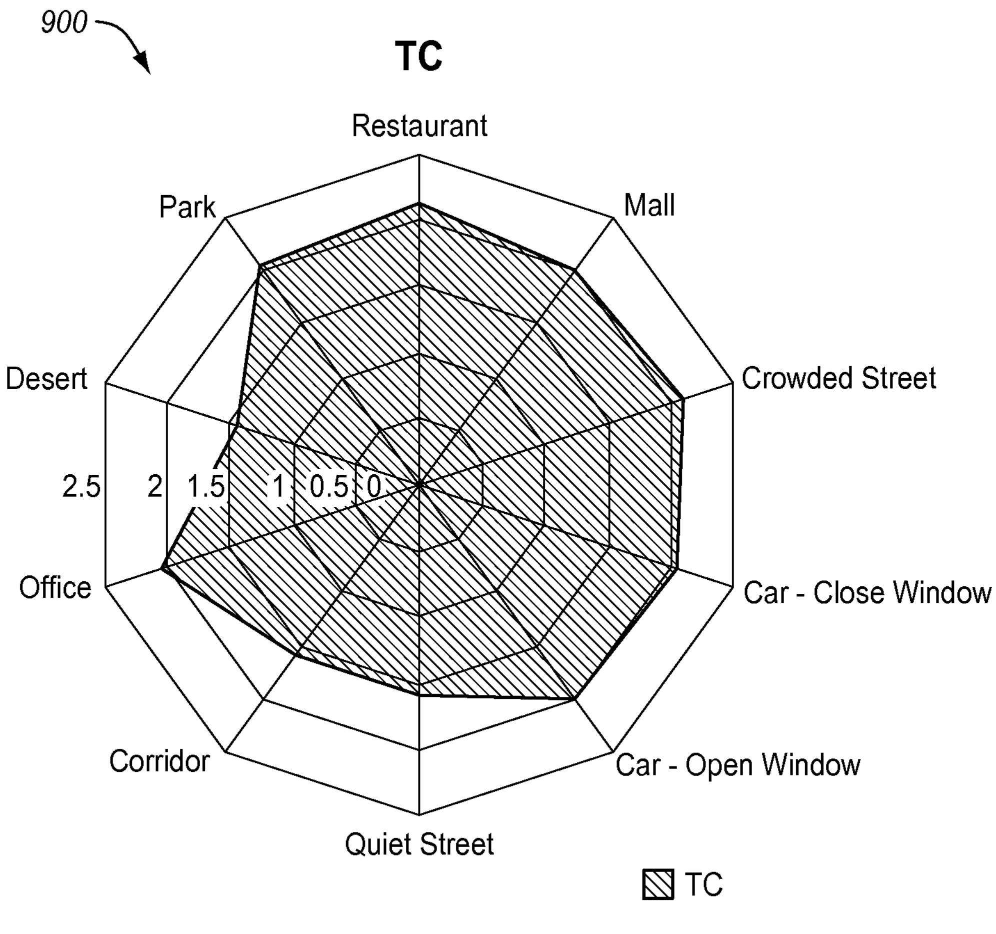
FIG. 9 is a graphical representation illustrating less discriminative power of MPEG-7 audio descriptor, Temporal Centroid ("TC"), for different environment classes, according to an example embodiment.

FIG. 9 is a graphical representation illustrating less discriminative power of MPEG-7 audio descriptor, Temporal Centroid ("TC"), for different environment classes, according to an example embodiment. Block 900 demonstrates less discriminative power of TC for ten different environment classes. More specifically, block 900 illustrates the F-ratios of the TC audio descriptor as applied to ten different environments. TC is a scalar value and it may be the same for all the environments. The graphical representation of block 900 shows that not much of a distinction can be made between the audio environments when TC is applied. In one embodiment, carefully removing less discriminative descriptors such as TC, may allow the environment recognizer to better classify different types of environments.

Figure 10:
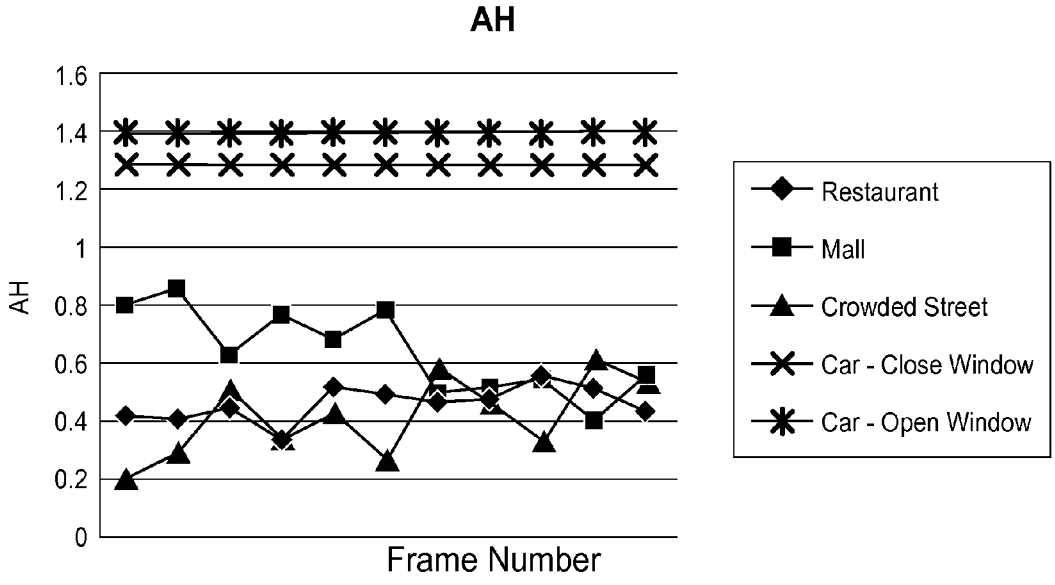
FIG. 10 is a graphical representation illustrating differentiation of F-ratio by frame, for MPEG-7 audio descriptor, Audio Harmonicity ("AH"), according to an example embodiment.

FIG. 10 is a graphical representation illustrating differentiation of F-ratio by frame, for MPEG-7 audio descriptor, Audio Harmonicity ("AH"), according to an example embodiment. Block 1000 demonstrates that not all the descriptors having high F-ratio can differentiate between each class. Some descriptors are good for certain type of discrimination. The vertical axis of block 1000 shows the F-ratio values for the audio descriptor, AH. The horizontal axis of block 1000 represents frame number of the AH audio descriptor over a period of time. For example, block 1000 shows AH for five different environments of which two are non-harmonic (car: close window and open window) and three having some harmonicity (restaurant, mall, and crowded street). Block 1000 demonstrates that this special descriptor is very much useful to discriminate between harmonic and non-harmonic environments.

FIGS. 11-14 show good examples of discriminative capabilities of ASS, ASE (fourth value of the vector), ASP (second and third values of the vector) for three closely related environment sounds: restaurant, mall, and crowded street.

Figure 11:
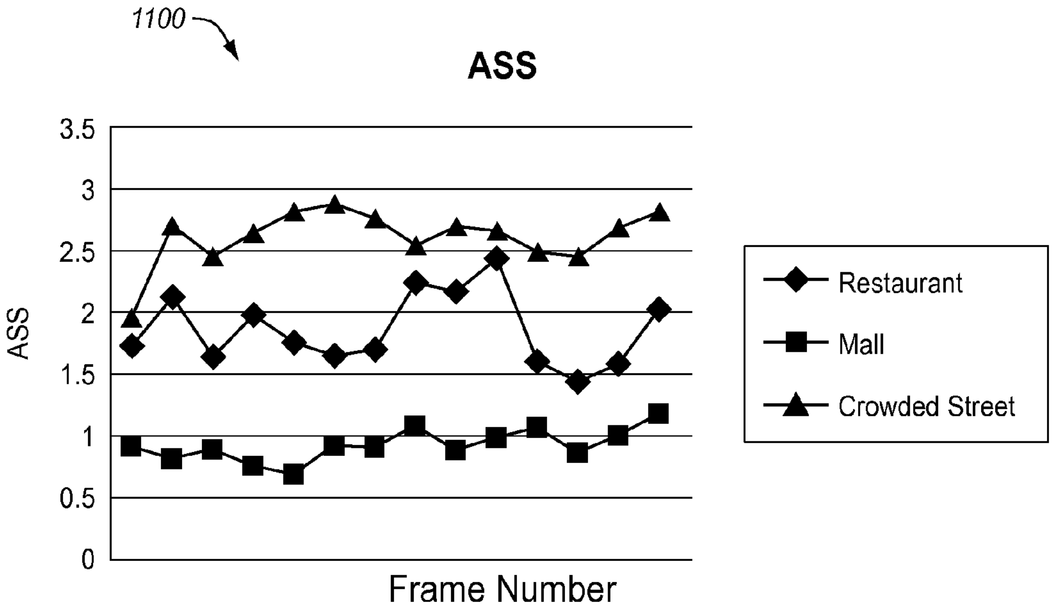
FIG. 11 is a graphical representation illustrating differentiation of F-ratio by frame, for MPEG-7 audio descriptor, Audio Spectrum Spread ("ASS"), according to an example embodiment.

FIG. 11 is a graphical representation illustrating differentiation of F-ratio by frame, for MPEG-7 audio descriptor, Audio Spectrum Spread ("ASS"), according to an example embodiment. Block 1100 demonstrates discriminative capabilities of the MPEG-7 audio low-level descriptor, ASS, as applied to three closely related environment sounds: restaurant, mall, and crowded street. The vertical axis of block 1100 shows the F-ratio values for the audio descriptor, ASS. The horizontal axis of block 1100 represents frame number of the ASS audio descriptor over a period of time.

Figure 12:
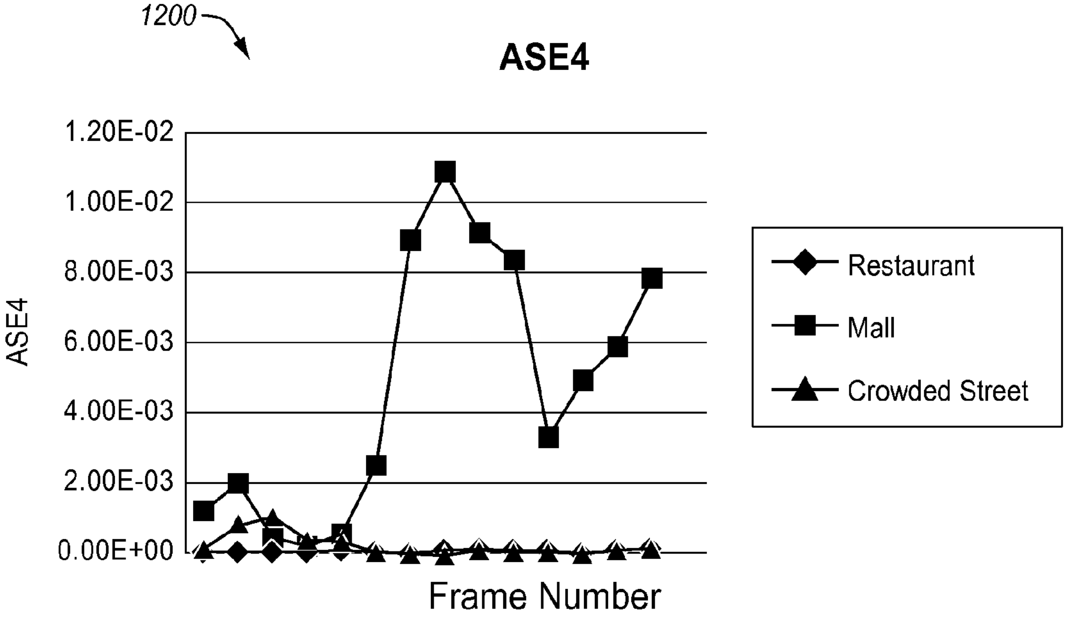
FIG. 12 is a graphical representation illustrating differentiation of F-ratio by frame, for MPEG-7 audio descriptor, Audio Spectrum Envelope ("ASE") (fourth value of the vector), according to an example embodiment.

FIG. 12 is a graphical representation illustrating differentiation of F-ratio by frame, for MPEG-7 audio descriptor, Audio Spectrum Envelop ("ASE") (fourth value of the vector), according to an example embodiment. Block 1200 demonstrates discriminative capabilities of the MPEG-7 audio low-level descriptor, ASE (fourth value of the vector), as applied to three closely related environment sounds: restaurant, mall, and crowded street. The vertical axis of block 1200 shows the F-ratio values for the audio descriptor, ASE (fourth value of the vector). The horizontal axis of block 1200 represents frame number of the ASE (fourth value of the vector) audio descriptor over a period of time.

Figure 13:
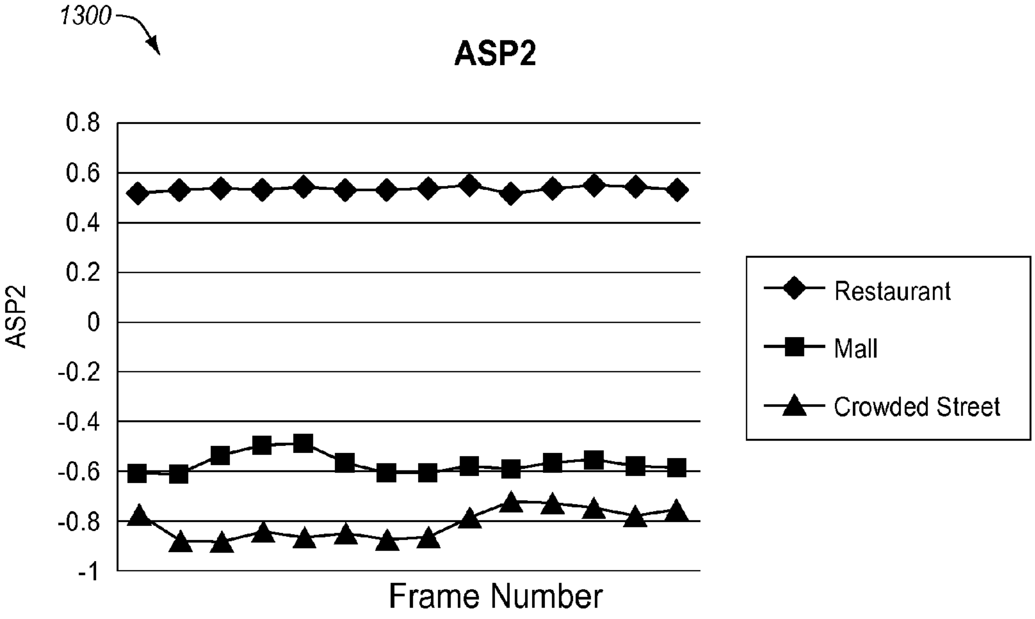
FIG. 13 is a graphical representation illustrating differentiation of F-ratio by frame, for MPEG-7 audio descriptor, Audio Spectrum Projection ("ASP") (second of the vector), according to an example embodiment.

FIG. 13 is a graphical representation illustrating differentiation of F-ratio by frame, for MPEG-7 audio descriptor, Audio Spectrum Projection ("ASP") (second of the vector), according to an example embodiment. Block 1300 demonstrates discriminative capabilities of the MPEG-7 audio low-level descriptor, ASP (second value of the vector), as applied to three closely related environment sounds: restaurant, mall, and crowded street. The vertical axis of block 1300 shows the F-ratio values for the audio descriptor, ASP (second value of the vector). The horizontal axis of block 1300 represents frame number of the ASP (second value of the vector) audio descriptor over a period of time.

Figure 14:
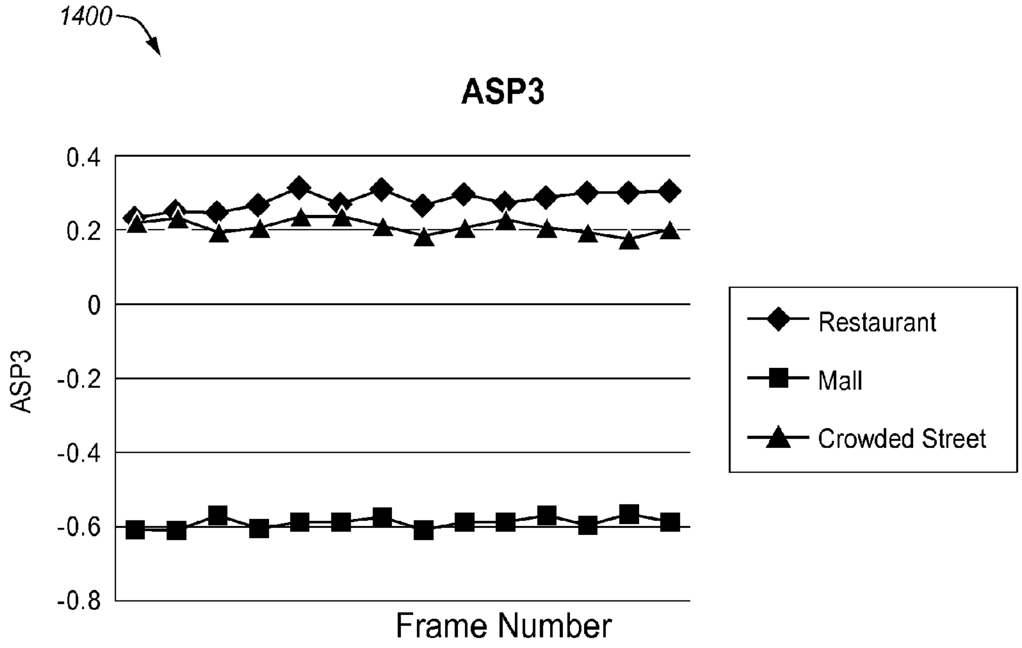
FIG. 14 is a graphical representation illustrating differentiation of F-ratio by frame, for MPEG-7 audio descriptor, Audio Spectrum Projection ("ASP") (third value of the vector), according to an example embodiment.

FIG. 14 is a graphical representation illustrating differentiation of F-ratio by frame, for MPEG-7 audio descriptor, Audio Spectrum Projection ("ASP") (third value of the vector), according to an example embodiment. Block 1400 demonstrates discriminative capabilities of the MPEG-7 audio low-level descriptor, ASP (third value of the vector), as applied to three closely related environment sounds: restaurant, mall, and crowded street. The vertical axis of block 1400 shows the F-ratio values for the audio descriptor, ASP (third value of the vector). The horizontal axis of block 1400 represents frame number of the ASP (third value of the vector) audio descriptor over a period of time.

Figure 15:
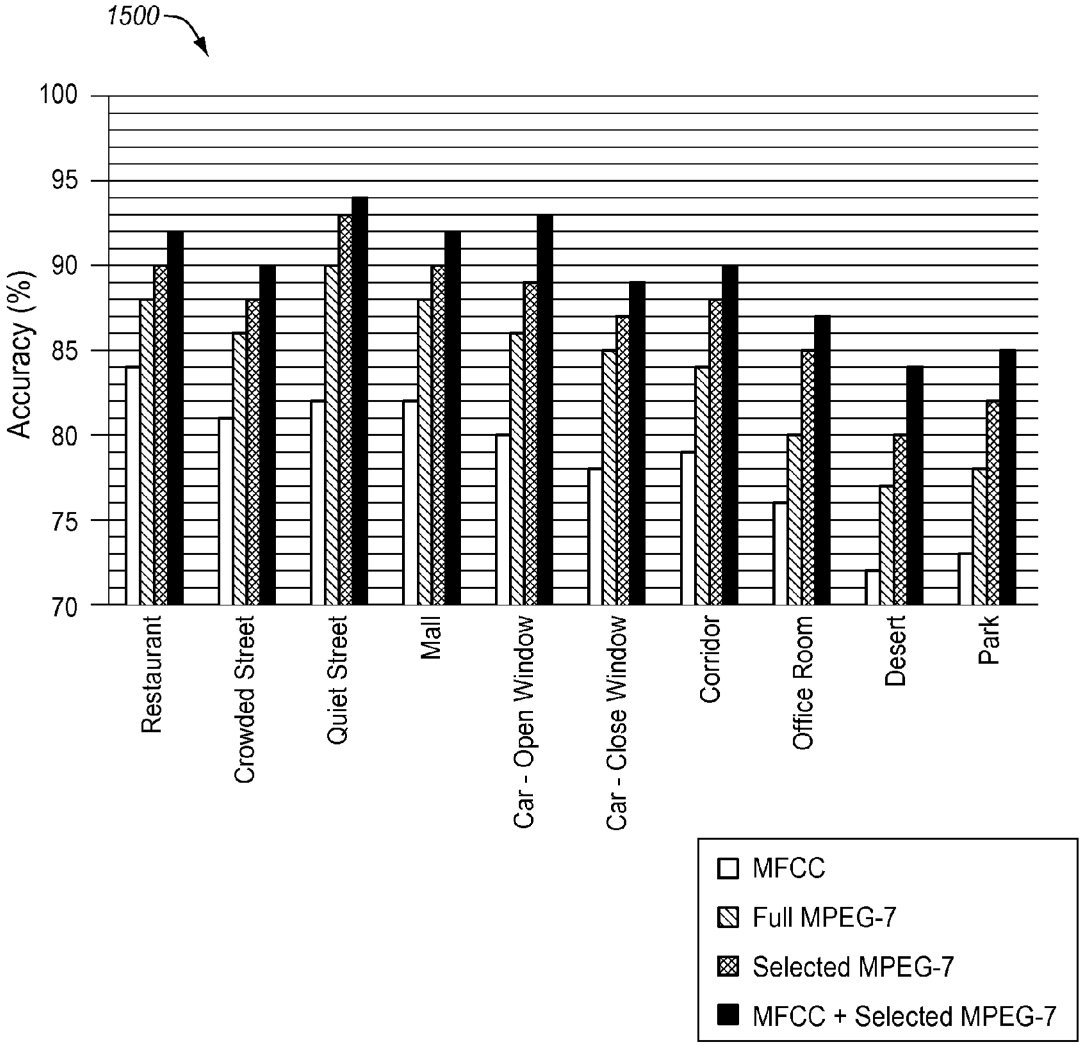
FIG. 15 is a graphical representation illustrating recognition accuracies of different environment sound in the presence of human foreground speech, according to an example embodiment.

FIG. 15 is a graphical representation illustrating recognition accuracies of different environment sound in the presence of human foreground speech, according to an example embodiment. The vertical axis of block 1500 shows the recognition accuracies (in percentage), while the horizontal axis represents ten (10) different audio environments. If a five second segment contains artificially added human speech of more than two-third of the length, it is considered as foreground speech segment for reference. At block 1500, the accuracy drops by a large percentage from the case of not adding speech. For example, accuracy falls from ninety-seven percent (97%) to ninety-two percent (92%) using combined feature set for the mall environment. The lowest recognition eighty-four percent (84%) is with the desert environment, followed by the park environment eighty-five percent (85%). Selected MPEG-7 descriptors perform better than full MPEG-7 descriptors, an absolute one percent to three percent (1%-3%) improvement is achieved in different environments.

Experimental Conclusions

In one embodiment, a method using F-ratio for selection of MPEG-7 low-level descriptors is proposed. In another embodiment, the selected MPEG-7 descriptors together with conventional MFCC features were used to recognize ten different environment sounds. Experimental results confirmed the validity of feature selection of MPEG-7 descriptors by improving the accuracy with less number of features. The combined MFCC and selected MPEG-7 descriptors provided the highest recognition rates for all the environments even in the presence of human foreground speech.

Exemplary Hardware and Operating Environment

This section provides an overview of one example of hardware and an operating environment in conjunction with which embodiments of the present disclosure may be implemented. In this exemplary implementation, a software program may be launched from a non-transitory computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 16 below.

FIG. 16 is a block diagram illustrating an audio environmental recognition system, according to an example embodiment. Such embodiments may comprise a computer, a memory system, a magnetic or optical disk, some other storage device, or any type of electronic device or system. The computer system 1600 may include one or more processor(s) 1602 coupled to a non-transitory machine-accessible medium such as memory 1604 (e.g., a memory including electrical, optical, or electromagnetic elements). The medium may contain associated information 1606 (e.g. computer program instructions, data, or both) which when accessed, results in a machine (e.g. the processor(s) 1602) performing the activities previously described herein.

CONCLUSION

This has been a detailed description of some exemplary embodiments of the present disclosure contained within the disclosed subject matter. The detailed description refers to the accompanying drawings that form a part hereof and which show by way of illustration, but not of limitation, some specific embodiments of the present disclosure, including a preferred embodiment. These embodiments are described in sufficient detail to enable those of ordinary skill in the art to understand and implement the present disclosure. Other embodiments may be utilized and changes may be made without departing from the scope of the present disclosure. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the present disclosure lies in less than all features of a single disclosed embodiment. Thus the following claims are hereby incorporated into the Detailed Description, with each claim standing on its own as a separate preferred embodiment. It will be readily understood to those skilled in the art that various other changes in the details, material, and arrangements of the parts and method stages which have been described and illustrated in order to explain the nature of this disclosure may be made without departing from the principles and scope as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method to identify audio data comprising:

ranking, with a computer programming processing module, a plurality of audio descriptors by calculating a Fisher's discriminant ratio for each audio descriptor;

selecting a configurable number of highest-ranking audio descriptors based on the Fisher's discriminant ratio of each audio descriptor to obtain a selected featured set; and applying the selected feature set to audio data to determine a background environment of the audio data.

2. The method of claim 1, further comprising appending the selected feature set with a set of frequency scale information approximating sensitivity of the human ear.

3. The method of claim 2, wherein the set frequency scale information approximating sensitivity of the human ear is a Mel-frequency scale.

4. The method of claim 1, wherein selecting further comprises applying principal component analysis to the configurable number of highest-ranking audio descriptors to obtain the selected feature set.

5. The method of claim 1, further comprising appending the selected feature set with zero-crossing rate features.

6. A method to select features for environmental recognition of audio input comprising:

ranking, with a computer programming processing module, MPEG-7 audio descriptors by calculating a Fisher's discriminant ratio for each audio descriptor;

selecting a configurable number of highest-ranking MPEG-7 audio descriptors based on the Fisher's discriminant ratio of each MPEG-7 audio descriptor; and applying principal component analysis to the selected highest-ranking MPEG-7 audio descriptors to obtain a feature set.

7. The method of claim 6, further comprising appending the feature set with a set of frequency scale information approximating sensitivity of the human ear.

8. The method of claim 7, wherein the set of frequency scale information approximating sensitivity of the human ear is Mel-frequency scale.

9. The method of claim 6, further comprising modeling the feature set to at least one audio environment.

10. The method of claim 9, wherein modeling further comprises applying a statistical classifier to model a background environment of an audio input.

11. The method of claim 10 wherein the statistical classifier is a Gaussian mixture model.

12. The method of claim 6, further comprising appending the feature set with zero-crossing rate features.

13. A computer system to enable environmental recognition of audio input comprising:

a feature selection module ranking a plurality of audio descriptors and selecting a configurable number of audio descriptors from the ranked audio descriptors to obtain a feature set;

a feature extraction module extracting the feature set obtained by the feature selection module and appending the feature set with a set of frequency scale information approximating sensitivity of the human ear; and a modeling module applying the combined feature set to at least one audio input to determine a background environment.

14. The computer system of claim 13, wherein the feature extraction module de-correlates the selected audio descriptors of the feature set by applying logarithmic function, followed by discrete cosine transform.

15. The computer system of claim 14, wherein the feature extraction module projects the de-correlated feature set onto a lower dimension space using principal component analysis.

16. The computer system of claim 13, further comprising a zero-crossing rate module appending zero-crossing rate features to the combined feature set, to improve dimensionality of the modeling module.

17. The computer system of claim 13, wherein the feature selection module ranks the plurality of audio descriptors by calculating the Fisher's discriminant ratio for each audio descriptor.

18. The computer system of claim 13, wherein the feature selection module selects the plurality of descriptors based on the Fisher's discriminant ratio for each audio descriptor.

19. The computer system of claim 13, wherein the modeling module utilizes Gaussian mixture models to model the at least one audio input.

20. The computer system of claim 13, wherein the modeling module incorporates at least one speech model.

* * * * *